United States Patent
Tsuzuki et al.

(10) Patent No.: US 6,715,966 B2
(45) Date of Patent: Apr. 6, 2004

(54) ROTARY CUTTING TOOL HAVING CORRUGATED CUTTING EDGE PORTION WHOSE PITCH AND/OR DEPTH ARE/IS INCREASED WITH INCREASE IN DIAMETER OF BODY OF THE CUTTING TOOL

(75) Inventors: Kiyoshi Tsuzuki, Toyokawa (JP); Naomi Tatebe, Shinshiro (JP); Satoru Kamata, Toyohashi (JP)

(73) Assignee: OSG Corporation, Aichi-ken (JP)

( * ) Notice: Subject to any disclaimer, the term of this patent is extended or adjusted under 35 U.S.C. 154(b) by 52 days.

(21) Appl. No.: 10/054,817

(22) Filed: Jan. 25, 2002

(65) Prior Publication Data

US 2002/0106252 A1 Aug. 8, 2002

(30) Foreign Application Priority Data

Feb. 2, 2001 (JP) ......................... 2001-026748

(51) Int. Cl.[7] .............. B26D 1/12; B23R 5/10
(52) U.S. Cl. ........................ 407/53; 407/57
(58) Field of Search ................ 407/53, 54, 56, 407/57, 59, 60, 63, 42, 65

(56) References Cited

U.S. PATENT DOCUMENTS

| RE26,544 E | * | 3/1969 | Castor, Sr. ........... 29/103 |
| 4,497,600 A | * | 2/1985 | Kishimoto ........... 407/53 |
| 6,164,877 A | * | 12/2000 | Kamata et al. ........ 407/61 |

FOREIGN PATENT DOCUMENTS

| JP | 6-335817 A | 12/1994 |
| JP | 7-11219 | 2/1995 |
| JP | 7-299635 A | 11/1995 |
| JP | 8-112709 A | 5/1996 |
| JP | 2576400 B2 | 11/1996 |
| JP | 9-029530 A | 2/1997 |

* cited by examiner

Primary Examiner—Willmon Fridie, Jr.
(74) Attorney, Agent, or Firm—Oliff & Berridge, PLC

(57) ABSTRACT

A rotary cutting tool which is to be rotated about an axis thereof for cutting a workpiece, including: a generally cylindrical body portion having (a) at least one flute each of which is formed in the cylindrical body portion and each of which extends from an axially distal end of the cylindrical body portion toward an axially proximal end of the cylindrical body portion, and (b) at least one cutting edge each of which is provided by one of widthwise opposite edges of the flute, wherein each of at least one cutting edge includes a corrugated edge portion having a corrugated shape, and wherein at least one of a pitch and a depth of the corrugated shape is increased with an increase in a diameter of the cylindrical body portion whose outer circumferential surface is defined by a rotary trajectory of an envelope passing through crests of the corrugated shape.

9 Claims, 3 Drawing Sheets

ROTARY CUTTING TOOL HAVING CORRUGATED CUTTING EDGE PORTION WHOSE PITCH AND/OR DEPTH ARE/IS INCREASED WITH INCREASE IN DIAMETER OF BODY OF THE CUTTING TOOL

BACKGROUND OF THE INVENTION

1. Field of the Invention

The present invention relates in general to a rotary cutting tool, and more particularly to improvements in such a rotary cutting tool having at least one peripheral cutting edge each of which includes a corrugated edge portion in the form of a roughing cutting edge portion or a nicked cutting edge portion.

2. Discussion of the Related Art

As one type of a rotary cutting tool which is to be rotated about its axis for machining or cutting a workpiece with its peripheral cutting edges, there is known a tapered end mill in which the diameter of the peripheral cutting edges is changed gradually in the axial direction. Such a tapered end mill is widely used for formation of a rib slot in a die or mold, cutting of a side face in a die or mold, or other kinds of machining works. There is proposed an end mill having, in each of its cutting edges, a corrugated edge portion which serves for breaking a cutting chip into small pieces and accordingly reducing a cutting resistance so as to improve cutting performance and cutting efficiency of the end mill, as disclosed in JP-A-H7-299635 (publication of unexamined Japanese Patent Application laid open in 1995) and JP-A-H9-29530 (publication of unexamined Japanese Patent Application laid open in 1997). The corrugated edge portion takes, for example, the form of a roughing cutting edge portion having sinuous shape in which the diameter is gradually changed in the axial direction, or the form of a nicked cutting edge portion in which a plurality of nicks are formed to be arranged with a constant spacing interval in the axial direction. Whichever the corrugated edge portion takes the form of the roughing cutting portion or the form of the nicked cutting edge portion, it can be said that the corrugated edge portion has, in its cross section taken in a plane containing a rake face which cooperates with a flank face to define the corresponding cutting edge, a corrugated shape consisting of a succession of protrusions and recesses which are alternately arranged. The pitch, depth and other dimension of the corrugated shape of the roughing cutting edge portion or nicked cutting edge portion are determined to have suitable amounts, commonly, in view of the diameter of a body portion in which the cutting edges are formed. When the diameter of the body portion is generally small, such dimensions of the corrugated shape of the roughing or nicked cutting edge are adapted to be small, so that the pieces into which the cutting chip is broken by the roughing or nicked cutting edge portion is sufficiently small. This is because the rigidity of the end mill is relatively small when the diameter of the body portion is relatively small.

The pitch, depth and other dimensions of the corrugated shape of the roughing or nicked cutting edge are held constant throughout the entire length of the corrugated edge portion of the cutting edge, even where the end mill is of a tapered end mill in which the diameter of the body portion is changed in the axial direction. That is, the dimensions of the corrugated shape of the corrugated edge portion of a tapered end mill are determined, for example, on the basis of the diameter of an axially intermediate portion of the body portion of the tapered end mill. However, the thus determined dimensions of the corrugated shape do not necessarily enable, particularly, axially opposite end portions of the body portion to exhibit a sufficient improvement in their cutting performance, in spite of the provision of the corrugated edge portion in the cutting edge. Namely, where the dimensions of the corrugated shape are determined on the basis of the diameter of the axially intermediate portion of the body portion, a sufficiently improved cutting performance is not necessarily exhibited by the axially opposite end portions of the body portion in which the diameter is increased and reduced, thereby undesirably reducing a degree of freedom in determining number of revolutions, feed rate and other cutting conditions which are applicable to the end mill.

SUMMARY OF THE INVENTION

It is therefore an object of the present invention to provide a rotary cutting tool which has a corrugated edge portion in the form of a roughing cutting edge portion or a nicked cutting edge, and which exhibits a sufficiently improved cutting performance in the entire axial length of each cutting edge irrespective of the change of diameter of the cutting edge. The object may be achieved according to any one of first through ninth aspects of the invention which are described below.

The first aspect of this invention provides a rotary cutting tool which is to be rotated about an axis thereof for cutting a workpiece, comprising: a generally cylindrical body portion having (a) at least one flute each of which is formed in the cylindrical body portion and each of which extends from an axially distal end of the cylindrical body portion toward an axially proximal end of the cylindrical body portion, and (b) at least one cutting edge each of which is provided by one of widthwise opposite edges of the flute, wherein each of the above-described at least one cutting edge includes a corrugated edge portion having a corrugated shape, and wherein at least one of a pitch and a depth of the corrugated shape is increased with an increase in a diameter of the cylindrical body portion whose outer circumferential surface is defined by a rotary trajectory of an envelope passing through crests of the corrugated shape.

The above-described corrugated shape may consist of a succession of protrusions and recesses which are alternately arranged. Each of the crests or peaks is defined as the highest point of a corresponding one of the protrusions. The pitch is defined as a distance between the crests or peaks of two successive protrusions, or between roots or bottoms of two successive recesses. The depth is defined as a distance between the crest and root which are adjacent to each other. It is noted that the cylindrical body portion includes a diameter changing portion whose diameter is changed in the axial direction.

According to the second aspect of the invention, in the rotary cutting tool defined in the first aspect of the invention, the generally cylindrical body portion includes a tapered body portion, so that the diameter of the cylindrical body portion is increased in a direction away from one of the axially distal and proximal ends of the body portion toward the other of the axially distal and proximal ends of the body portion. In the rotary cutting tool of this second aspect of the invention, the cylindrical body portion includes the above-described diameter changing portion in the form of the tapered body portion.

According to the third aspect of the invention, in the rotary cutting tool defined in the first or second aspect of the invention, the pitch of the corrugated shape is increased with the increase in the diameter of the cylindrical body portion such that the following expression (1) is satisfied:

$$0.5+(3/100)\times D \leq P \leq 2+(3/25)\times D \qquad (1);$$

wherein D represents the diameter of the cylindrical body portion; and P represents the pitch of the corrugated shape. It is noted that the pitch represents a distance measured along a generating line of the diameter changing portion or tapered body portion, between the crests or peaks of two successive protrusions, or between the roots or bottoms of two successive recesses, whichever each of the above-described at least one flute consist of a straight flute or a helical flute.

The fourth aspect of this invention provides a rotary cutting tool which is to be rotated about an axis thereof for cutting a workpiece, comprising: a generally cylindrical body portion having (a) at least one flute each of which is formed in the cylindrical body portion and each of which extends from an axially distal end of the cylindrical body portion toward an axially proximal end of the cylindrical body portion, and (b) at least one cutting edge each of which is provided by one of widthwise opposite edges of the flute, wherein each of the above-described at least one cutting edge includes a roughing cutting edge portion having a corrugated shape consisting of a succession of protrusions and recesses which are alternately arranged, each of the protrusions having a first radius of curvature while each of the recesses having a second radius of curvature, and wherein at least one of a pitch of the corrugated shape, a depth of the corrugated shape, the first radius of curvature and the second radius of curvature is increased with an increase in a diameter of the cylindrical body portion whose outer circumferential surface is defined by a rotary trajectory of an envelope passing through crests of the corrugated shape.

The above-described roughing cutting edge portion can be formed, for example, by forming a plurality of grooves in the flank face such that the grooves are arranged along each of the above-described at least one cutting edge with a predetermined spacing interval between two successive grooves.

According to the fifth aspect of the invention, in the rotary cutting tool defined in the fourth aspect of the invention, the generally cylindrical body portion includes a tapered body portion, so that the diameter of the cylindrical body portion is increased in a direction away from one of the axially distal and proximal ends of the body portion toward the other of the axially distal and proximal ends of the body portion.

According to the sixth aspect of the invention, in the rotary cutting tool defined in the fourth or first aspect of the invention, the pitch of the corrugated shape is increased with the increase in the diameter of the cylindrical body portion such that the following expression (2) is satisfied:

$$0.5+(3/100)\times D \leq P_R \leq 2+(3/25)\times D \qquad (2);$$

wherein D represents the diameter of the cylindrical body portion; and $P_R$ represents the pitch of the corrugated shape. It is noted that the pitch represents a distance measured along a generating line of the diameter changing portion or tapered body portion, between the crests or peaks of two successive protrusions, or between the roots or bottoms of two successive recesses, whichever each of the above-described at least one flute consist of a straight flute or a helical flute.

The seventh aspect of this invention provides a rotary cutting tool which is to be rotated about an axis thereof for cutting a workpiece, comprising: a generally cylindrical body portion having (a) at least one flute each of which is formed in the cylindrical body portion and each of which extends from an axially distal end of the cylindrical body portion toward an axially proximal end of the cylindrical body portion, and (b) at least one cutting edge each of which is provided by one of widthwise opposite edges of the flute, wherein each of the above-described at least one cutting edge includes a nicked cutting edge portion having a corrugated shape, and wherein at least one of a pitch and a depth of the corrugated shape is increased with an increase in a diameter of the cylindrical body portion whose outer circumferential surface is defined by a rotary trajectory of an envelope passing through crests of the corrugated shape.

The above-described nicked cutting edge portion can be formed, for example, by forming a plurality of nicks or grooves in the flank face such that the nicks or grooves are arranged along each of the above-described at least one cutting edge with a predetermined spacing interval between two successive nicks or grooves.

According to the eighth aspect of the invention, in the rotary cutting tool defined in the seventh aspect of the invention, the generally cylindrical body portion includes a tapered body portion, so that the diameter of the cylindrical body portion is increased in a direction away from one of the axially distal and proximal ends of the body portion toward the other of the axially distal and proximal ends of the body portion.

According to the ninth aspect of the invention, in the rotary cutting tool defined in the seventh or eighth aspect of the invention, the pitch of the corrugated shape is increased with the increase in the diameter of the cylindrical body portion such that the following expression (3) is satisfied:

$$0.5+(3/100)\times D \leq P_N \leq 2+(3/25)\times D \qquad (3);$$

wherein D represents the diameter of the cylindrical body portion; and $P_N$ represents the pitch of the corrugated shape. It is noted that the pitch represents a distance measured along a generating line of the diameter changing portion or tapered body portion, between the crests or peaks of two successive protrusions, or between the roots or bottoms of two successive recesses, whichever each of the above-described at least one flute consist of a straight flute or a helical flute.

In the rotary cutting tool defined in any one of the first through third aspects of the invention in which at least one of the pitch and depth of the corrugated shape of the corrugated edge portion is increased with the increase in the diameter of the cylindrical body portion, the corrugated shape can be adapted to have dimensions suitable for the diameter throughout an entire axial length of the corrugated edge portion. This arrangement enables the rotary cutting tool to exhibit a sufficiently improved cutting performance in the entire axial length of each cutting edge irrespective of the change of the diameter of the cylindrical body portion, thereby enabling the rotary cutting tool to cut a workpiece with an increased rate and an increased depth of cut.

In the rotary cutting tool defined in any one of the fourth through sixth aspects of the invention in which at least one of the pitch, depth, first radius of curvature and second radius of curvature of the corrugated shape of the roughing cutting edge portion is increased with the increase in the diameter of the cylindrical body portion, the corrugated shape can be adapted to have dimensions suitable for the diameter throughout the entire axial length of the roughing cutting edge portion. This arrangement provides substantially the same technical advantages as those provided by the arrangement of each of the first through third aspects of the invention.

In the rotary cutting tool defined in any one of the seventh through ninth aspects of the invention in which at least one of the pitch and depth of the corrugated shape of the nicked cutting edge portion is increased with the increase in the diameter of the cylindrical body portion, the corrugated shape can be adapted to have dimensions suitable for the diameter throughout the entire axial length of the nicked cutting edge portion. This arrangement also provides substantially the same technical advantages as those provided by the arrangement of each of the first through third aspects of the invention.

In the rotary cutting tool defined in any one of the third, sixth and ninth aspects of the invention in which the pitch of the corrugated shape is increased with the increase in the diameter of the cylindrical body portion such that the above-described expression (1), (2) or (3) is satisfied, it is possible to more reliably exhibit a sufficiently improved cutting performance in the entire axial length of each cutting edge irrespective of the change of the diameter of the cylindrical body portion.

The present invention is preferably applied to an tapered end mill in which the cylindrical body portion having the cutting edge or edges formed therein consists a tapered body portion. However, the invention is applicable also to a formed end mill such as a so-called "Christmas-tree cutter" in which the body portion has at least one large diameter portion and at least one small diameter portion which are alternately arranged in the axial direction so as to have a Christmas-tree-like configuration. That is, the invention is applicable to any rotary cutting tool as long as the cylindrical body portion of the cutting tool includes a diameter changing portion whose diameter is changed in the axial direction. Further, although it is preferable that each of the above-described at least one flute may consist of a helical flute extending in a helical direction which is inclined or twisted with respect to the axis of the cylindrical body portion by a predetermined angle so that the above-described at least one cutting edge extends in the helical direction, each of the above-described at least one flute may consist of a straight flute extending in parallel with the axis of the body portion so that the above-described at least one cutting edge extends straight.

The above-described at least one flute preferably consists of at least two flutes so that the above-described at least one cutting edge consists of at least two cutting edges. Where the above-described at least one cutting edge consists of at least two cutting edges, the corrugated edge portion of each of the cutting edges is preferably formed such that the corrugated shape of the corrugated edge portion in each cutting edge is out of phase with that in any one of the cutting edges other than the above-described each cutting edge, as viewed in the axial direction of the cylindrical body portion. Described more specifically, it is preferable that a phase of the corrugated shape of the corrugated edge portion in each cutting edge is offset from that in one of the cutting edges which is circumferentially adjacent to the above-described each cutting edge, by an amount corresponding to a quotient of the pitch divided by the number of the cutting edges [by (pitch)/(number of cutting edges)]. This arrangement is effective to minimize parts of the workpieces which are left uncut due to the recesses of the corrugated shape, and accordingly improved the smoothness of the cut surface of the workpiece.

The pitch of the corrugated shape may be changed with a change of the diameter in a stepped manner, e.g., every pitch. Namely, the pitch may be changed in such a manner that the pitch is held constant within each pair of adjacent protrusion and recess while being changed between two pairs of adjacent protrusions and recesses. The other dimensions of the corrugated shape, i.e., the depth, first radius of curvature and second radius of curvature may be changed in a stepped manner, or alternatively, may be changed in a gradual manner such that these dimensions are changed even within each pitch. Further, the first radius of curvature and second radius of curvature can be changed in every protrusion or recess.

In the rotary cutting tool defined in any one of the fourth through sixth aspects of the invention in which the corrugated edge portion takes the form of the roughing cutting edge portion, if the pitch is changed, at least one of the depth, first radius of curvature and second radius of curvature is preferably changed together with the change of the pitch, so that all the protrusions and all the recesses providing the corrugated shape have substantially similar figures (i.e., figures substantially identical except for size). Each pair of protrusion and recess, which are adjacent to each other and cooperate with each other to constitute one pitch, may have respective radiuses of curvatures substantially equal to each other. However, the radiuses of curvatures of each pair of protrusion and recess do not have to be equal to each other but may be different from each other.

In the rotary cutting tool of each of the fourth through sixth aspects of the invention, the depth, first radius of curvature and second radius of curvature of the corrugated shape are preferably determined such that the following expressions (4)–(6) are satisfied:

$$0.05P_R \leq H_R \leq 0.5P_R \qquad (4);$$

$$0.2P_R \leq R_{R1} \leq 2.4P_R \qquad (5);$$

$$0.2P_R \leq R_{R2} \leq 2.4P_R \qquad (6);$$

wherein $P_R$ represents the pitch of the corrugated shape;

$H_R$ represents the depth of the corrugated shape;

$R_{R1}$ represents the first radius of curvature of the protrusion of the corrugated shape; and $R_{R2}$ represents the second radius of curvature of the recess of the corrugated shape.

In the rotary cutting tool of each of the seventh through ninth aspects of the invention in which the corrugated edge portion takes the form of the nicked cutting edge portion, the depth of the corrugated shape is preferably determined such that the following expression (7) is satisfied:

$$0.05P_N \leq H_N \leq 0.5P_N \qquad (7);$$

wherein $P_N$ represents the pitch of the corrugated shape; and $H_N$ represents the depth of the corrugated shape.

In the rotary cutting tool of any one of the third, sixth and ninth aspects of the invention in which the pitch of the corrugated shape is determined such that the above-described expression (1), (2) or (3) is satisfied, it is preferable that the pitch is set to be approximated to an amount obtained in accordance with the corresponding one of the following expressions (8)–(10). Namely, the pitch is preferably held within a range whose lower and upper limits correspond to the obtained amount minus 20% and the obtained amount plus 20%, respectively, as expressed in the following expressions (11)–(13).

$$P=1+(2/25)\times D \qquad (8);$$

$$P_R=1+(2/25)\times D \qquad (9);$$

$$P_N = 1 + (2/25) \times D \quad (10);$$

$$(1-0.2)[1+(2/25) \times D] \leq P \leq (1+0.2)[1+(2/25) \times D] \quad (11);$$

$$(1-0.2)[1+(2/25) \times D] \leq P_R \leq (1+0.2)[1+(2/25) \times D] \quad (12);$$

$$(1-0.2)[1+(2/25) \times D] \leq P_N \leq (1+0.2)[1+(2/25) \times D] \quad (13);$$

While the pitch of the corrugated shape is changed with the change in the diameter of the cylindrical body portion in the cutting tool of each of the third, sixth and ninth aspects of the invention, the pitch may be held fixed with the depth, first radius of curvature and/or second radius of curvature being changed with the change in the diameter of the cylindrical body portion in the cutting tool of each of the other aspects of the invention.

Where the cylindrical body portion of the rotary cutting tool has a portion in which the diameter of the cylindrical body portion is more than 50 mm, such a portion of the diameter more than 50 mm generally has a high degree of rigidity. Therefore, there is not a need for necessarily changing the pitch and other dimensions of the corrugated shape in such a portion having a high degree of rigidity. In view of this, it can be said that the present invention is advantageously applied to, particularly, a rotary cutting tool whose cylindrical body portion include a portion in which the diameter is larger than 50 mm.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which.

DETAILED DESCRIPTION OF THE PREFERRED EMBODIMENT

Figure 1A:
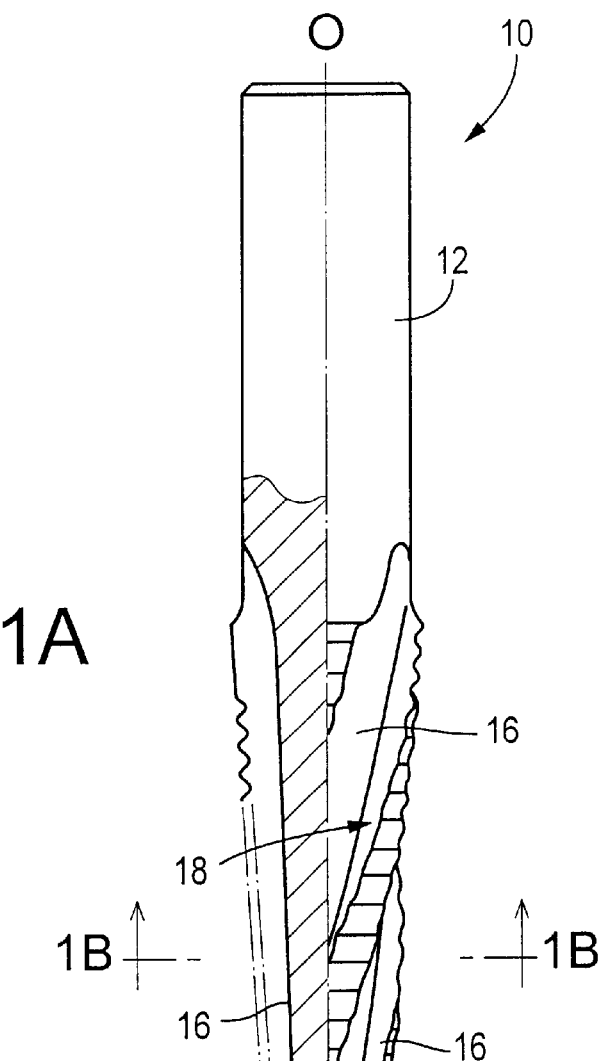
FIG. 1A is a front elevational view partially in cross section of a taper end mill, which is constructed according to an embodiment of this invention.
Figure 1B:
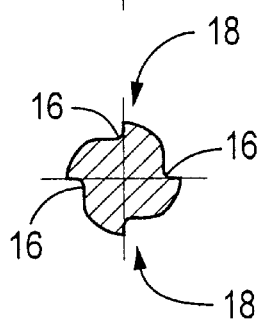
FIG. 1B is a cross sectional view taken along line 1B—1B of FIG. 1A.

FIG. 1A is a front elevational view partially in cross section of a rotary cutting tool in the form of a taper end mill 10 which is constructed according to one embodiment of this invention, while FIG. 1B is a cross sectional view taken along line 1B—1B of FIG. 1A. The taper end mill 10 is to be used for formation of a rib slot in a die or mold, cutting of a side face in a die or mold, or other kinds of machining work. In a machining work, the taper end mill 10 is moved relative to a die, mold or other workpiece mainly in a direction not parallel to an axis O of the end mill 10, while being rotated about the axis O in a predetermined rotating direction. The taper end mill 10 has a shank portion 12 and a generally cylindrical body portion in the form of a tapered body portion 14 which is contiguous to the shank portion 12 in the axial direction. Four helical flutes 16 are formed in an outer circumferential surface of the tapered body portion 14 such that the four helical flutes 16 are located around the axis O and are equi-angularly spaced apart from each other at an angular interval of 90°. Four peripheral cutting edges 18 are formed along the respective four helical flutes 16. Described more specifically, each of the four peripheral cutting edge 18 is provided by one of widthwise opposite edges of the corresponding one of the four helical flutes 16. In other words, each of the four peripheral cutting edges 18 is defined by an intersection of a rake face and a flank face which are adjacent to each other in a circumferential direction of the end mill 10. The rake face is provided by one of widthwise opposite faces of each of the four helical flutes 16, which one is located on a rear side of the other of the widthwise opposite faces as viewed in the rotating direction, i.e., in the counter-clockwise direction as seen in FIG. 1B.

The tapered body portion 14 has a diameter which is generally reduced as viewed in a direction away from the shank portion 12 toward the axially distal end portion of the body portion 14. That is, each of the peripheral cutting edges 18, formed in the outer circumferential surface of the body portion 14, is inclined with respect to the axis O by a predetermined angle, so that a diameter of the peripheral cutting edges 18 is gradually changed in the axial direction. The body portion 14 has, in its distal end portion, a semispherical portion which provides four ball-end cutting edges 20. The four ball-end cutting edges 20 are contiguous to the respective four peripheral cutting edges 18. It is noted that a left-sided portion of FIG. 1A represents a rotary trajectory of one of the peripheral cutting edges 18.

Figure 2:
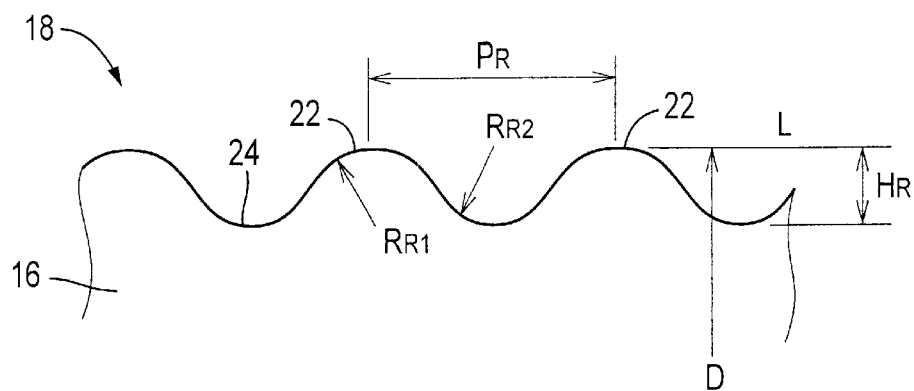
FIG. 2 is an enlarged view of a roughing cutting edge portion of a peripheral cutting edge of the end mill of FIG. 1A, as seen from a helical flute of the end mill.

Each of the peripheral cutting edges 18 includes a corrugated edge portion in the form of a roughing cutting edge portion having a corrugated or sinuous shape consisting of a succession of protrusions 22 and recesses 24 which are alternately arranged. Owing to the sinuous shape consisting of the protrusions 22 each having a first radius $R_{R1}$ of curvature and the recesses 24 each having a second radius $R_{R2}$ of curvature, the roughing cutting edge portion has a diameter which is alternately increased and reduced in a gradual manner. FIG. 2 is an enlarged view of the roughing cutting edge portion of one of the peripheral cutting edges of the end mill of FIG. 1A, as seen from the corresponding helical flute in a direction perpendicular to the axis O. This enlarged view of FIG. 2 is a projection in which the peripheral cutting edge 18 is projected onto a plane containing the axis O and a generating line of the tapered body portion 14 and lying on a certain circumferential position. A pitch $P_R$ and a depth $H_R$ of the sinuous shape, the first radius $R_{R1}$ of curvature and the second radius $R_{R2}$ of curvature are increased with the increase in diameter of the tapered body portion 14 whose outer circumferential surface is defined by a rotary trajectory of an envelop L passing through crests of the sinuous shape, i.e., through a crest of each protrusion 22. These dimensions of the sinuous shape are increased with the increase in the diameter of the tapered body portion 14 in a stepped manner such that these dimensions are changed every pitch of the sinuous shape.

Figure 3:
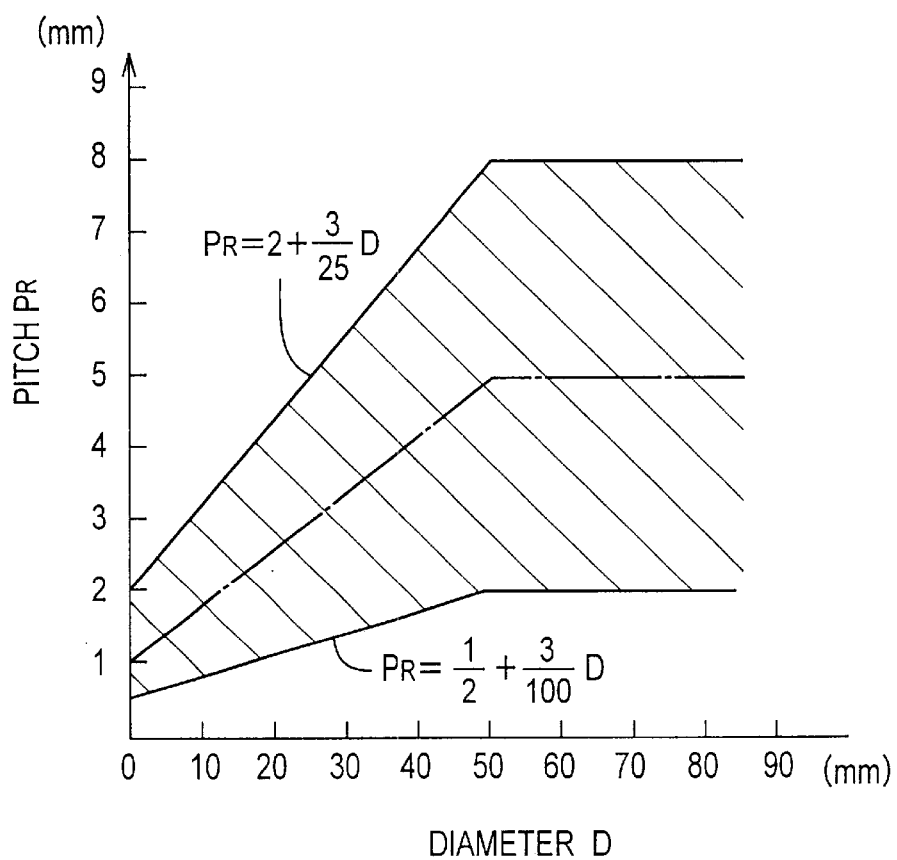
FIG. 3 is a graph indicating a relationship between a pitch of a corrugated shape of the roughing cutting edge portion and a diameter of a cylindrical body portion of the end mill of FIG. 1A.

In the taper end mill 10 of the present embodiment of the invention in which the tapered body portion 14 does not include a portion whose diameter is larger than 50 mm, the pitch $P_R$ is held in such a range that satisfies the above-described expression (2) $(0.5+(3/100) \times D \leq P_R \leq 2+(3/25) \times D)$ as represented by the oblique-lined portion in a graph of FIG. 3. More specifically, the pitch $P_R$ is changed in accordance with the above-described expression (9) $(P_R = 1 + (2/$ 25)×D) as represented by the one-dot chain line in the graph of FIG. 3, while the depth $H_R$, the first radius $R_{R1}$ of curvature and the second radius $R_{R2}$ of curvature are increased together with the increase of the pitch $P_R$, so that all the protrusions 22 and all the recesses 24 providing the corrugated shape have substantially similar figures (i.e., figures substantially identical except for size). That is, not only the pitch $P_R$ but also the other dimensions of the sinuous shape, i.e., the depth $H_R$, the first radius $R_{R1}$, of curvature and the second radius $R_{R2}$ of curvature are changed every pitch the sinuous shape. For example, the depth $H_R$ is changed such that a ratio of the depth $H_R$ to the pitch $P_R$ is held constant, and such that the above-described expression (4) ($0.05P_R \leq H_R \leq 0.5P_R$) is satisfied. Each of the first radius $R_{R1}$ of curvature and the second radius $R_{R2}$ of curvature is changed such that a ratio of the first radius $R_{R1}$ to the pitch $P_R$ and a ratio of the second radius $R_{R2}$ to the pitch $P_R$ are held constant, such that the above-described expressions (5), (6) ($0.2P_R \leq R_{R1} \leq 2.4P_R$, $0.2P_R \leq R_{R2} \leq 2.4P_R$) are satisfied, and such that the second radius $R_{R2}$ of curvature of each recession 24 is larger than the first radius $R_{R1}$ of curvature of the corresponding protrusion 22 which is adjacent to each recession 24. The protrusions 22 and recessions 24 are formed by forming circumferentially-extending grooves in the flank faces, such that each protrusion 22 and recession 24 have predetermined first radius $R_{R1}$ of curvature and second radius $R_{R2}$ of curvature in the projection of FIG. 2 in which the peripheral cutting edge 18 is projected onto a plane containing the axis O. It is noted that the pitch $P_R$ is measured along a generating line of the tapered body portion 14.

The sinuous shape of the roughing cutting edge portion of each peripheral cutting edge 18 is out of phase with that of any one other peripheral cutting edges 18. Described more specifically, a phase of the sinuous shape of the rough cutting edge portion of each peripheral cutting edge 18 is offset from that of the circumferentially-adjacent peripheral cutting edge 18, by 1/4 pitch of the sinuous shape.

If the tapered body portion 14 includes a portion whose diameter is larger than 50 mm, the pitch $P_R$ is held constant within a range of 2–8 mm, for example, is about 50 mm, and the depth $H_R$, first radius $R_{R1}$ of curvature and second radius $R_{R2}$ of curvature are held constant as the pitch $P_R$ in such a portion having the diameter larger than 50 mm.

In the tapered end mill 10 constructed as described above, the pitch $P_R$ of the sinuous shape of the roughing cutting edge portion of each peripheral cutting edge 18 is changed every pitch of the sinuous shape, with the change in the diameter D of the tapered body portion 14 in accordance with the above-described expression (9), and the depth $H_R$, radius $R_{R1}$ of curvature and radius $R_{R2}$ of curvature are changed every pitch of the sinuous shape, together with the change in the pitch $P_R$. Therefore, the sinuous shape of the entirety of the roughing cutting edge portion of each peripheral cutting edge 18 has dimensions suitable for the changed diameter D of the tapered body portion 14, whereby a cutting chip is broken by the roughing cutting edge portion into pieces each having a suitable size, leading to an improvement of cutting performance in the entirety of the tapered end mill 10, and enabling the end mill 10 to cut a workpiece with an increased rate and an increased depth of cut.

Figure 4:
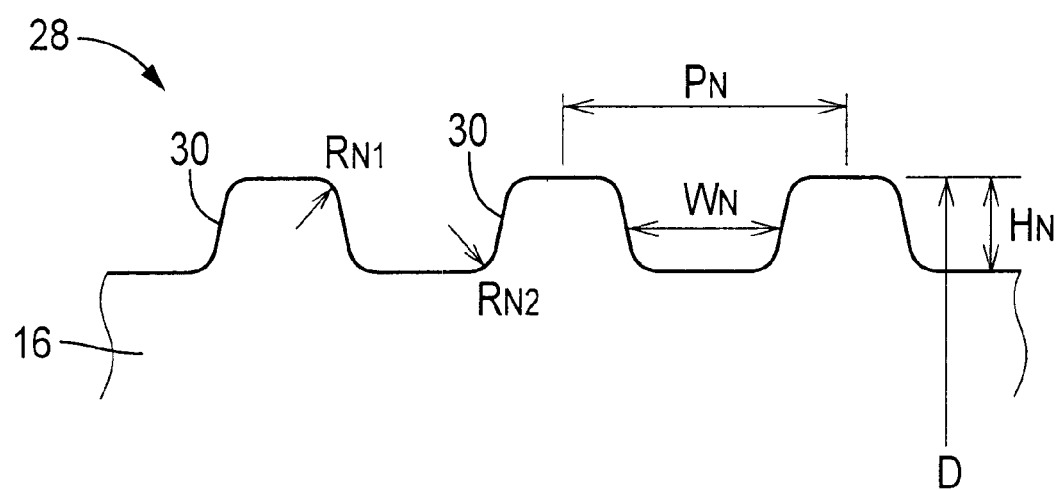
FIG. 4 is an enlarged view of a nicked cutting edge portion of a peripheral cutting edge of a taper end mill constructed according to another embodiment of the invention, as seen from a helical flute of the end mill.

While each of the peripheral cutting edges 18 includes the roughing cutting edge portion as the corrugated edge portion in the above-described embodiment, the corrugated edge portion may be modified as in another embodiment shown in FIG. 4 in which a peripheral cutting edge 28 includes a nicked cutting edge portion. This nicked cutting edge portion is formed, by forming a plurality of grooves or nicks 30 in the flank face such that the nicks 30 are arranged with a predetermined spacing interval. A pitch $P_N$ of the corrugated shape of the nicked cutting edge portion, i.e, a distance between two successive nicks 30, is changed every pitch of the corrugated shape, with the change in the diameter D of the tapered body portion 14 in accordance with the above-described expression (10) ($P_N=1+(2/25)\times D$), and a depth $H_N$ and width $W_N$ of the nick 30 are changed every pitch of the corrugated shape, together with the change in the pitch $P_N$. The width $W_N$ represents an average amount of distance between mutually opposed side faces of the nick 30, which distance is increased as viewed in a direction away from a bottom face of the nick 30 toward an opening of the nick 30, as shown in FIG. 4. The width $W_N$ is changed such that a ratio of the width $W_N$ to the pitch $P_N$ is held constant, for example, in about 0.5 ($W_N=0.5P_N$) in the entirety of the nicked cutting edge portion. The depth $H_N$ is changed such that a ratio of the depth $H_N$ to the pitch $P_N$ is held constant and such that the above-described expression (7) ($0.05P_N \leq H_N \leq 0.5P_N$) is satisfied. Each of widthwise opposite edges of the nick 30 is rounded to have a radius $R_{N1}$ of curvature. Each of bottom corners, which are defined by respective intersections of the opposed side faces and the bottom face of the nicks 30, is rounded to have a radius $R_{N2}$ of curvature. The radius $R_{N1}$ of curvature and the radius $R_{N2}$ of curvature are changed with the change in the pitch $P_N$ such that the radiuses $R_{N1}$, $R_{N2}$ are increased in the increase in the $P_N$. FIG. 4 is an enlarged view of the nicked cutting edge portion as seen from one of the helical flutes of the end mill. Like the pitch $P_R$ in the above-described embodiment, the pitch $P_N$ is measured along a generating line of the tapered body portion 14. It is noted that the widthwise opposite edges and bottom corners of the nick 30 do not have to be necessarily rounded, namely, the radiuses $R_{N1}$, $R_{N2}$ of curvatures may be zero.

In the tapered end mill constructed according to this embodiment, the pitch $P_N$ of the corrugated shape of the nicked cutting edge portion of each peripheral cutting edge 18 is changed every pitch of the corrugated shape, with the change in the diameter D of the tapered body portion 14 in accordance with the above-described expression (10), and the depth $H_N$ and width $W_N$ are changed every pitch of the corrugated shape, together with the change in the pitch $P_N$. Therefore, the corrugated shape of the entirety of the roughing cutting edge portion of each peripheral cutting edge 18 has dimensions suitable for the changed diameter D of the tapered body portion 14, whereby a cutting chip is broken by the nicked cutting edge portion into pieces each having a suitable size, leading to an improvement of cutting performance in the entirety of the tapered end mill, and enabling the end mill to cut a workpiece with an increased rate and an increased depth of cut.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A rotary cutting tool which is to be rotated about an axis thereof for cutting a workpiece, comprising:
   a generally cylindrical body portion having (a) at least one flute each of which is formed in said cylindrical body portion and each of which extends from an axially distal end of said cylindrical body portion toward an axially proximal end of said cylindrical body portion, and (b) at least one cutting edge each of which is provided by one of widthwise opposite edges of said flute, wherein each of said at least one cutting edge includes a corrugated edge portion having a corrugated shape, and wherein at least one of a pitch and a depth of said corrugated shape is increased with an increase in a diameter of said cylindrical body portion said diameter being defined by a rotary trajectory of an envelope passing through crests of said corrugated shape.

2. A rotary cutting tool according to claim 1, wherein said generally cylindrical body portion includes a tapered body portion, so that said diameter of said cylindrical body portion is increased in a direction away from one of said axially distal and proximal ends of said cylindrical body portion toward the other of said axially distal and proximal ends of said cylindrical body portion.

3. A rotary cutting tool according to claim 1, wherein said pitch of said corrugated shape is increased with the increase in said diameter of said cylindrical body portion such that the following expression is satisfied:

$$0.5+(3/100) \times D \leq P \leq 2+(3/25) \times D;$$

wherein D represents said diameter of said cylindrical body portion; and P represents said pitch of said corrugated shape.

4. A rotary cutting tool which is to be rotated about an axis thereof for cutting a workpiece, comprising:

a generally cylindrical body portion having (a) at least one flute each of which is formed in said cylindrical body portion and each of which extends from an axially distal end of said cylindrical body portion toward an axially proximal end of said cylindrical body portion, and (b) at least one cutting edge each of which is provided by one of widthwise opposite edges of said flute, wherein each of said at least one cutting edge includes a roughing cutting edge portion having a corrugated shape consisting of a succession of protrusions and recesses which are alternately arranged, each of said protrusions having a first radius of curvature while each of said recesses having a second radius of curvature, and wherein at least one of a pitch of said corrugated shape, a depth of said corrugated shape, said first radius of curvature and said second radius of curvature is increased with an increase in a diameter of said cylindrical body portion said diameter being defined by a rotary trajectory of an envelope passing through crests of said corrugated shape.

5. A rotary cutting tool according to claim 4, wherein said generally cylindrical body portion includes a tapered body portion, so that said diameter of said cylindrical body portion is increased in a direction away from one of said axially distal and proximal ends of said cylindrical body portion toward the other of said axially distal and proximal ends of said cylindrical body portion.

6. A rotary cutting tool according to claim 4, wherein said pitch of said corrugated shape is increased with the increase in said diameter of said cylindrical body portion such that the following expression is satisfied:

$$0.5+(3/100) \times D \leq P_R \leq 2+(3/25) \times D;$$

wherein D represents said diameter of said cylindrical body portion; and $P_R$ represents said pitch of said corrugated shape.

7. A rotary cutting tool which is to be rotated about an axis thereof for cutting a workpiece, comprising:

a generally cylindrical body portion having (a) at least one flute each of which is formed in said cylindrical body portion and each of which extends from an axially distal end of said cylindrical body portion toward an axially proximal end of said cylindrical body portion, and (b) at least one cutting edge each of which is provided by one of widthwise opposite edges of said flute, wherein each of said at least one cutting edge includes a nicked cutting edge portion having a corrugated shape, and wherein at least one of a pitch and a depth of said corrugated shape is increased with an increase in a diameter of said cylindrical body portion said diameter being defined by a rotary trajectory of an envelope passing through crests of said corrugated shape.

8. A rotary cutting tool according to claim 7, wherein said generally cylindrical body portion includes a tapered body portion, so that said diameter of said cylindrical body portion is increased in a direction away from one of said axially distal and proximal ends of said cylindrical body portion toward the other of said axially distal and proximal ends of said cylindrical body portion.

9. A rotary cutting tool according to claim 7, wherein said pitch of said corrugated shape is increased with the increase in said diameter of said cylindrical body portion such that the following expression is satisfied:

$$0.5+(3/100) \times D \leq P_N \leq 2+(3/25) \times D;$$

wherein D represents said diameter of said cylindrical body portion; and $P_N$ represents said pitch of said corrugated shape.

* * * * *